US00H002244H

(19) United States
(12) Statutory Invention Registration
Clay et al.

(10) Reg. No.: US H2244 H
(43) Published: Aug. 3, 2010

(54) METHOD FOR OPERATING CATALYTIC REFORMERS

(75) Inventors: Russell T. Clay, League City, TX (US); Stuart S. Goldstein, Fairfax, VA (US)

(73) Assignee: ExxonMobil Research and Engineering Company, Annandale, NJ (US)

(21) Appl. No.: 11/085,867

(22) Filed: Mar. 22, 2005

(65) Prior Publication Data

US 2006/0213811 A1 Sep. 28, 2006

(51) Int. Cl.
*C09D 4/00* (2006.01)

(52) U.S. Cl. ..... 208/137; 208/133; 208/134; 208/136; 208/141; 208/60; 208/63; 208/64

(58) Field of Classification Search ..... 208/133, 208/134, 136, 137, 141, 60, 63, 64
See application file for complete search history.

(56) References Cited

U.S. PATENT DOCUMENTS

| | | | | |
|---|---|---|---|---|
| 2,374,109 | A | 4/1945 | Layng et al. | |
| 2,664,386 | A | 12/1953 | Haensel | |
| 3,705,094 | A | 12/1972 | Keith et al. | 208/65 |
| 4,073,716 | A | 2/1978 | Pfefferle et al. | 208/66 |
| 4,110,197 | A | 8/1978 | Herning et al. | |
| 4,172,027 | A | 10/1979 | Ham et al. | |
| 4,250,018 | A | 2/1981 | Peters | 208/49 |
| 4,250,019 | A | 2/1981 | Peters | |
| 5,190,638 | A | 3/1993 | Swan et al. | 208/65 |
| 5,196,110 | A | 3/1993 | Swart et al. | 208/65 |
| 5,211,838 | A | 5/1993 | Staubs et al. | 208/65 |
| 2004/0129605 | A1 | 7/2004 | Goldstein et al. | 208/134 |

OTHER PUBLICATIONS

Golem et al. "Conversion of Fixed–Bed Reformers to UOP CCR Platforming Technology" 1990.*
U.S. Appl. No. 60/564133 filed April 21, 2004.

* cited by examiner

*Primary Examiner*—Michelle Clement
(74) *Attorney, Agent, or Firm*—Jack B. Murray

(57) ABSTRACT

A reforming process in which a hydrocarbon feed containing aliphatic hydrocarbons is converted to a hydrocarbon product comprising an increased proportion of aromatics by passage over a reforming catalyst in a sequence of moving bed reactors operating under reforming conditions including moderate hydrogen pressure. The process is applicable when a former fixed moving bed reformer has been converted to moving bed reactor operation with the recycle and other ancillary equipment retained so that moderate pressure (hydrogen partial pressure at least 11 barg) is required, usually with a catalysts such as Pt/Re which tend to exhibit excessive hydrogenolysis activity in moving bed service. The recycle hydrogen stream is split with a portion going to at least one reactor subsequent to the first reactor.

20 Claims, 1 Drawing Sheet

Figure 1:
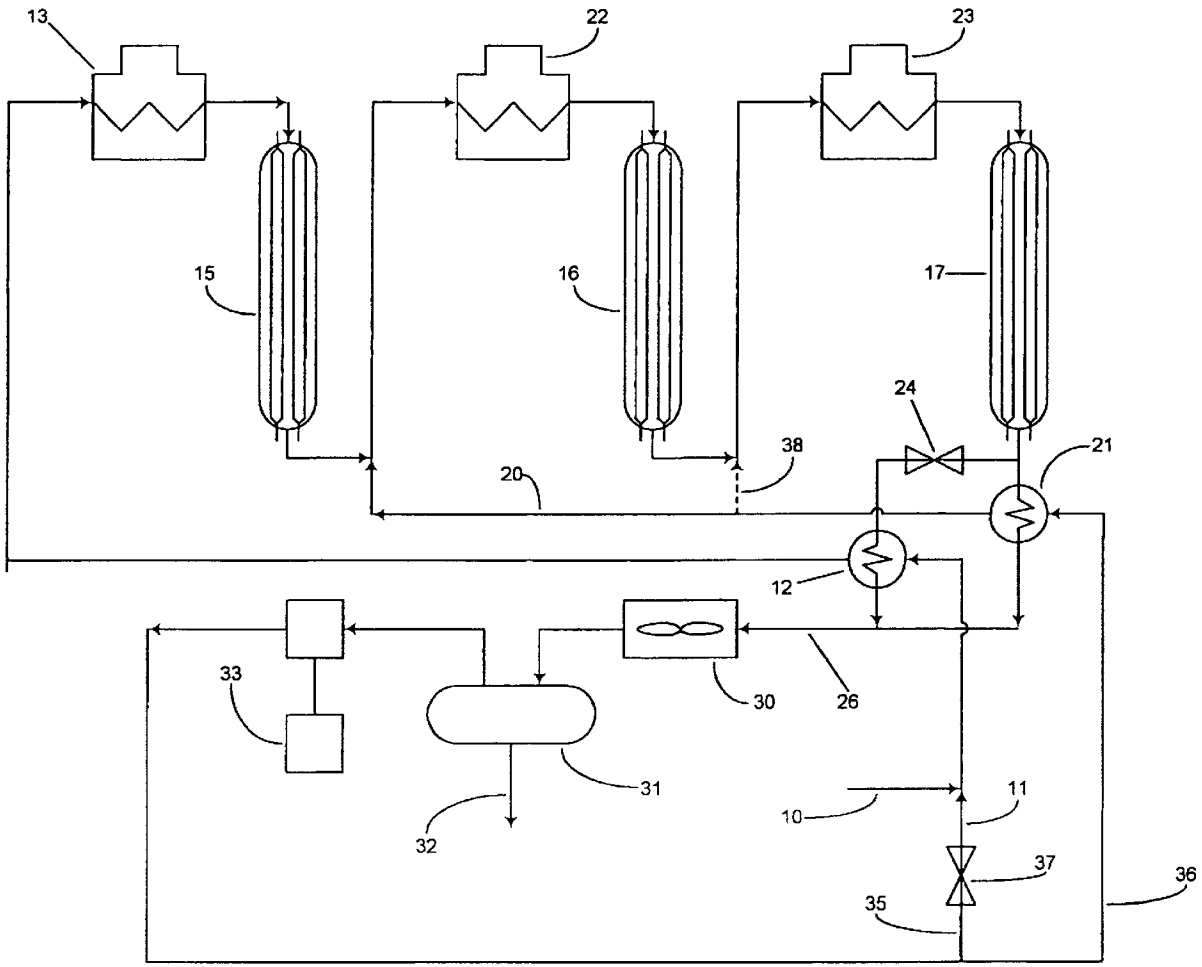

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR OPERATING CATALYTIC REFORMERS

CROSS REFERENCE TO RELATED APPLICATIONS

This application is related to U.S. patent applications Ser. Nos. 10/690,801 (Publication No. U.S. 2004/0129605A1) and U.S. 60/564,133 (Publication No. 2005/0274648), both of which relate to the conversion of fixed bed (semi-regenerative or cyclic) reforming units to operation with moving bed reactors.

FIELD OF THE INVENTION

The invention relates generally to catalytic reformers. More particularly, the invention relates to in improved method for operating high pressure, fixed-bed catalytic reformer units which have been converted to units with continuous, moving-bed reactors.

BACKGROUND OF THE INVENTION

Catalytic reforming is an established refinery process used for improving the octane quality of hydrocarbon feeds and, as noted in U.S. 2004/0129605A1, reforming processes were traditionally operated as semiregenerative or cyclic processes using fixed bed reactors or, more recently, as continuous processes using moving bed reactors. Proposals have also been made for combining fixed and moving bed reactors with the regeneration mode being appropriate to the reactor types used in the hybrid configuration, so that the fixed bed reactors have retained the fixed bed type regeneration, usually semiregenerative, and the moving bed reactors in the unit have retained the dedicated moving bed regenerator. Units of this hybrid type are disclosed, for example, in U.S. 4,498,973; U.S. 5,190,638; U.S. 5,190,639; U.S. 5,5,196,110; U.S. 5,5,211,838; U.S. 5,5,221,463; U.S. 5,354,451; U.S. 5,368,720 and U.S. 5,417,843 as well as in the technical literature, for example, in NPRA Paper No. AM-96-50 "IFP Solutions for Revamping Catalytic Reforming Units" (1996 NPRA Annual Meeting, Mar. 17-19, 1996) which describes a moving bed reforming unit in which two moving bed reactor stacks share a common regenerator. UOP has recently announced its CycleX® Process for increased hydrogen production from a fixed bed reforming unit by the addition of a circulating catalyst reactor as the final reactor in the reactor sequence. This reactor is provided with its own heater and regenerator as an expansion of existing assets rather than as a substitution of them. See NPRA Paper AM-03-93 and the UOP technical data sheet at http://www.uop.com/objects/cyclextechsheet.pdf.

In semiregenerative reforming, the entire reforming process unit is operated by gradually and progressively increasing the temperature to compensate for deactivation of the catalyst caused by coke deposition, until finally the entire unit is shut-down for regeneration and reactivation of the catalyst which is carried out with the catalyst remaining in the reactor. In cyclic reforming, the reactors are individually isolated by various piping arrangements. The catalyst is regenerated and then reactivated while the other reactors of the series remain on line. A "swing reactor" temporarily replaces the reactor which is removed from the series for regeneration and reactivation of the catalyst, which is then put back in the series. In continuous reforming, the reactors are moving-bed reactors with continuous or intermittent addition and withdrawal of catalyst through which the catalyst moves progressively before it is passed to a regeneration zone for regeneration and rejuvenation before being returned once again to the reactor. In the regenerator, at least a portion of the deposited coke is burned off and the regenerated catalyst is recycled to the reactor to continue the cycle. Commercial continuous reforming units may have the reactors arranged in a side-by-side or in a stacked configuration. Because the continuous mode of operation with its frequent regeneration can tolerate a higher rate of coke lay-down on the catalyst, it is possible to operate continuous units at lower and more favorable pressures than those normally used with semi-regenerative and cyclic units in which it is important or at least desirable to extend catalyst life between successive regenerations.

Semiregenerative and cyclic reforming units may be converted to continuous moving-bed units to take advantage of the improved yield of higher octane reformate and hydrogen associated with continuous lower pressure operation but the conversions which have so far been considered are essentially entire unit replacements which require replacement of all existing vessels and most of the ancillary equipment as well as installation of an integrated catalyst regenerator which is one of the most costly items in the conversion. The cost of the regenerator can be as much as about seventy percent of the total cost required for the conversion. U.S. patent applications Ser. Nos. 10/690,081 (Publication No. U.S. 2004/0129605A1) and 60/564,133 describe different conversion techniques by which fixed bed reformers may be converted to moving bed operation without the major expense normally associated with a complete conversion. The technique described in U.S. patent application Ser. No. 10/690,081 replaces the fixed bed reactors with moving bed reactors but retains the existing heaters and piping and eliminates the need for an individual, dedicated regenerator either by utilizing off-site regeneration or by utilizing a regenerator of another unit. The technique described in U.S. patent application Ser. No. 60/564,133, by contrast, enables a fixed bed unit to be converted to a unit with moving bed reactors while converting existing fixed-bed reactor vessels to use as regenerator vessels which are switched in a cyclic sequence between filling, regeneration/rejuvenation and emptying modes.

As noted above, a major advantage of moving bed operation is that it may be operated under a regime in which hydrogen production and conversion of aliphatics to aromatics proceeds to a more favorable equilibrium under the prevailing lower pressure regime. While catalyst coking proceeds at a greater rate under these conditions of reduced hydrogen partial pressure, this is acceptable when the catalyst is regenerated after only a relatively short cycle time in the reactor stack. The conditions normally encountered in continuous, moving bed reforming do, however, impose their own limitations on the choice of catalyst. While fixed bed reformers, whether of the cyclic or semi-regenerative type traditionally used catalysts based on the platinum-rhenium (Pt/Re) combination, these catalysts, even with additional metallic promoters such as iridium, were not optimal for moving bed operation. Under the low pressure conditions used in conventional moving bed reformers, typically below 11 bar (gauge), the normal commercially available catalysts are platinum-tin (Pt/Sn) and this combination of metals is notably more active than the Pt/Re combination for dehydrocyclization at low hydrogen partial pressures. A problem arises, however, with the low cost revamps described in the two applications referred to above, which are intended to provide a route to moving bed reactor operation while avoiding the major expense of regenerator acquisition and replacement of existing ancillary equipment including, especially, the recycle gas compressors and furnaces which are very expensive. The retention of the recycle circuit often limits the magnitude of the pressure reduction which can be achieved during the revamp. If the minimum revamped pressure has to be kept above 11 bar (approx. 160 psig), typically between about 13 and 35 barg (approx. 190 to 510 psig), catalysts based on the Pt/Re combination used at the higher pressures of traditional fixed bed operation may be preferred.

Existing commercial practice in fixed bed reactors using Pt/Re catalysts, enables sufficient coke to be rapidly deposited, even near the inlet of the first reactor, to mitigate the undesirable hydrogenolysis activity associated with the rhenium; in moving bed operation, by contrast, the catalyst closest to the inlet of the first reactor, will consistently have a coke level which is substantially lower than that found in fixed bed operation with Pt/Re catalysts, even shortly after start of run since fresh, uncoked catalyst is continuously added to the inlet of the first reactor. The freshly added Pt/Re catalyst in the first moving bed reactor does not acquire sufficient coke sufficiently quickly to mitigate the inherent hydrogenolysis activity to an acceptable level within a reasonable period of time. Moving bed pilot plant studies with Pt/Re catalyst have shown that even at relatively slow catalyst circulation rates, the steady state coke level anywhere in the lead reactor would be well below 1 weight percent on catalyst. While some of the hydrogenolysis can be mitigated by presulfiding the freshly regenerated Pt/Re catalyst before it is added to the top of the lead reactor, this sulfur is stripped from the catalyst relatively quickly and does not sufficiently suppress hydrogenolysis as the catalyst moves slowly down through the lead reactor. As a result, the refiner seeking to avail himself of a low cost fixed-to-moving bed conversion faces a dilemma: if existing recycle and other equipment is retained, requiring operation at moderate pressure, it may not be economic to use the catalysts which are preferred at moderate pressure conditions because of excessive hydrogenolysis; on the other hand, the Pt/Sn catalysts used in commercial moving bed reformers are not preferred at the higher pressures. Thus, there is a need for resolving this dilemma in a way which permits operation of a revamped unit with the Pt/Re and other catalysts which afford the best performance in the moderate pressure regime imposed by the equipment limitations.

SUMMARY OF THE INVENTION

The performance of catalysts in moving bed reactors, especially of Pt/Re and Pt/Ir based catalysts, at moderate pressures can be improved by splitting the recycle gas stream, such that only a portion of the total recycle gas is returned to the inlet of the first reactor. This diversion of hydrogen-rich recycle gas away from the first reactor, will decrease the H2/hydrocarbon molar ratio in the first reactor, and increase the catalyst coke level within the first reactor to a level at which the undesirable hydrogenolysis reactions are suppressed, Although, it is desirable to minimize the catalyst coke level in most commercial reforming processes, in this unique case, the intentional coke deposition in the lead moving bed reactor(s) will increase hydrogen purity, hydrogen yield, reformate yield, and aromatics yield. A reduction of the total recycle rate of hydrogen-rich gas would, by contrast, not produce the same benefit as this diversion of a portion of the recycle gas flow away from the first reactor: if the total recycle gas flow rate is too low, it will cause an undesirable increase in the rate of coke formation across all reactors, including those in which the catalyst already has sufficient coke to inhibit rhenium hydrogenolysis activity. The splitting of the hydrogen recycle among the reactors, therefore, reduces undesired hydrogenolysis in the precise location where, under these conditions, it has become a problem. In addition, the diversion of the recycle gas also has the advantage of reducing the pressure drop in the recycle circuit so as to permit lower pressure operation of the recycle gas compressor or a higher relative naphtha feed rate.

According to the present invention, therefore, the reforming process is carried out in a sequence of moving bed reactors operating under reforming conditions including a hydrogen partial pressure of at least 11 bar gauge (approx, 160 psig), has the recycle hydrogen resulting from the reforming reactions recycled to the first reactor and to at least one reactor in the sequence subsequent to the first reactor,

THE DRAWING

FIG. 1 shows a continuous moving-bed reforming unit built from an existing high pressure fixed-bed reformer unit with a split hydrogen recycle circuit.

DETAILED DESCRIPTION

The present invention is applicable to catalytic naphtha reforming, that is to the process in which a hydrocarbon feed in the naphtha boiling range is subjected to reactions at elevated temperature including dehydrogenation, dehydrocyclization, isomerization and hydrocracking to convert aliphatic hydrocarbons in the naphtha feed to aromatics so as to result in a product comprising an increased proportion of aromatics (relative to the feed). Depending on the properties of the naphtha feedstock (as measured by the paraffin, olefin, naphthene, and aromatic content) and catalysts used, the reformate product can be produced with very high concentrations of toluene, benzene, xylene, and other aromatics useful in gasoline blending and petrochemical processing. Hydrogen, a significant by-product, is separated from the reformate for recycling and use in other refinery processes. While the reactions involved in the overall reforming process include both exothermic and endothermic components, the overall reaction is endothermic and requires substantial amounts of process heat to carry it to the desired point. The older type of fixed bed reformers typically operated at moderate to high hydrogen pressures in order to extend the cycle life of the catalyst between regeneration cycles; the more modem continuous catalytic reformers, however, are capable of operating in a lower, more favorable pressure regime. The present invention is principally applicable to operation with moving bed reactors in the high to moderate pressure range, typically above about 11 barg and usually above about 12 barg. Pressure of this order, typically in the range of 15-27 barg, will normally be encountered in moving bed reactors in units made by the conversion of older, fixed bed units where the compressor, furnaces, and associated recycle equipment have been retained, for example, as described in applications Ser. Nos. 10/690,081 and 60/564.433, for reasons of economy.

FIG. 1 depicts a catalytic reformer unit which has been converted to moving bed reactor operation from fixed bed (cyclic or semi-regenerative) operation as described in U.S. patent application Ser. No. 10/690,081 using offsite or community catalyst regeneration. In this case, recycle gas diverted away from the first reactor inlet is passed through a low-pressure drop heat exchanger, and then combined with the first reactor effluent. The combined stream, containing both the diverted recycle gas and effluent from the first reactor, then passes through the first reheat furnace before entering the inlet of the second reactor. The recycle gas diverted away from the first reactor inlet, is passed through a dedicated, low-pressure drop, feed/effluent heat exchanger to minimize circuit pressure drop. This strategy allows the maximum reduction in the pressure drop across both the primary feed/effluent heat exchanger train, the preheat furnace, and the first reactor, due to a decrease in the recycle gas flow rate through each.

In the unit shown in FIG. 1, the hydrocarbon feed enters through line 10 and is combined with recycle hydrogen from line 11. The combined hydrocarbon/hydrogen feed then passes through heat exchanger 12 in which it picks up heat from the effluent from the final reactor (three shown). The combined feed then passes through furnace 13 to bring it to the required temperature to enter first reactor 15 in which the reforming reactions commence. Reactor 15, like the second and third stage reactors 16 and 17, is a moving bed reactor that replaces the former fixed bed reactor from a cyclic or semi-regenerative reforming unit. Normally, the reactor vessel will be a radial flow reactor to minimize pressure drop. Additional hydrogen recycle gas from line 20 which has picked up heat from the effluent from third stage reactor 17 in heat exchanger 21 joins the effluent from first stage reactor 15 and the combined hydrocarbon/hydrogen stream then passes to the second stage reactor 16 by way of second furnace 22 and from second stage reactor 16 in the conventional manner to third stage reactor 17 by way of third furnace 23. The effluent from the third stage reactor is split and passes through heat exchangers 12 and 21 to heat the recycle streams, with the ratio of hot effluent between the two exchangers being controlled by valve 24 in accordance with the selected recycle split ratio. The split effluents are then recombined in line 26 before passing to air cooler 30, separator 31 from which the reformate product is removed through line 32 with recycle hydrogen passing to recycle compressor 33. The recycle hydrogen is split between lines 35 and 36 to be directed, respectively, to the first stage feed through line 11 and to the second stage feed through line 20 with the split ratio being controlled by means of valve 37. If desired, the recycle hydrogen may be split between all three reactors using line 38 for this purpose although, given the fact that the majority of the dehydrocyclization takes place in the third stage reactor this will not normally be desired if conditions conducive to most favorable equilibrium are to be attained.

For the purposes of this illustration, the reactors are shown as being oriented side by side but either side by side or vertically stacked configurations may be used. Similarly, three reactors are shown, arranged in series. The split recycle arrangement is, however, applicable also to cases with two reactors in series and cases with more than three reactors in series. In each case, the objective is to reduce the proportion of recycle gas to the point where sufficient coke accumulation on the catalyst will take place to suppress or inhibit the undesired hydrogenolysis reactions in the lead reactors. Because these reactions take place for the most part over the freshly regenerated catalyst, the hydrogen partial pressure at the first stage reactor inlet is the most sensitive variable and the split ratio should be adjusted accordingly; the split, if any is provided between or among the remaining reactors is less significant in its effects since by the time the catalysts enters the subsequent stages, coke deposition will have taken place and hydrogenolysis reduced. Thus, in most case, a split between the first and second stages will be all that is required, as shown in FIG. 1, where all the recycle gas diverted away from the first reactor, is combined with the effluent from the first reactor.

FIG. 1 depicts a configuration in which the recycle gas diverted from the first reactor is passed through a separate feed/effluent heat exchanger (21) prior to being combined with the first reactor effluent. The primary reason for sending the split recycle gas streams through separate feed effluent heat exchangers is that in most reformers the feed, along with all the recycle gas, is preheated in the existing feed-effluent heat exchanger. When the split recycle is used, however, it may be desirable to heat the recycle gas stream that goes to the inlet of the second reactor separately to avoid bypassing some of the feed to the inlet of the second reactor. This may not be necessary, however, if the reheat furnace upstream of each subsequent reactor has, as is normally the case, sufficient capacity to heat the feed and the split recycle gas stream to the required temperature for the reactor. In such cases, the recycle gas diverted away from the first reactor need not be passed through a separate feed/effluent heat exchanger prior to being redistributed between the inlets to any of the subsequent reactors.

The split recycle mode of operation has two key benefits:

It allows lower circuit pressure drop across the existing feed effluent heat exchangers, preheat furnace, and lead reactor(s), than would be possible if all recycle gas were returned to the inlet of the first reactor. This is important in the revamp of an existing fixed bed unit where the existing recycle gas compressor could otherwise limit the extent of the revamp. The reduced pressure drop across the unit provides for (a) lower pressure operation of the existing recycle gas compressor at constant naphtha feed rate, (b) higher naphtha feed rate at constant pressure or (c) some combination of (a) and (b). Second, the lower operating pressure also improves yields of reformate and hydrogen from the reformer.

The lower $H_2$/hydrocarbon molar ratio, in the lead reactor (s), will increase the catalyst coke level. Nominally, two or more weight percent coke is desirable on Pt/Re catalysts to reduce undesirable hydrogenolysis activity associated with the rhenium. This intentional coke lay down in the first and possibly second moving bed reactors, will increase hydrogen purity, hydrogen yield, reformate yield, and aromatics yield.

Reforming process simulations indicate that $H_2$ production, $H_2$ purity and reformate yield will increase by a relative 25%, 1.2% and 0.35%, respectively, for each 69 kPag (10 psig) reduction in pressure (2400-2070 kPag (350-300 psig) range). The pilot unit data shown Table 1 summarizes the yield benefits of increasing the lead reactor coke level, for moving bed Pt/Re catalysts. The data in Table 1 was collected at the following process conditions: Naphtha feed rate=1.5 $hr^{-1}$ WHSV, reactor pressure=2400 Kpag (350 psig), $H_2$/hydrocarbon molar ratio=1.8, reformate octane=98 C5+RON.

The ratio between the volume of hydrogen going to the first stage reactor and subsequent reactors may be determined empirically, depending upon the catalyst being used and the conditions employed in the first stage reactor. Normally, it may be expected that the fraction of the total recycle gas going to the first stage reactor could be as little as 25-50%.

The conversion of the fixed bed unit to moving bed reactor operation may suitably be carried out as described in application Ser. No. 10/690,801 or 60/564,133, to which reference is made for a description of the conversion technique. The split recycle mode is however applicable to use with units of other types with a sequence of at least two moving bed reactors operating at moderate to high pressures. In the conversion of fixed bed units, the fixed-bed reactor vessels will be converted to a moving bed reactor unit which allows continuous or intermittent addition of fresh or regenerated catalyst to its catalyst inlet and continuous or intermittent removal of spent catalyst from the catalyst outlet of the unit after the final reactor in the unit. The unit will be provided with catalyst feed facilities for continuously or intermittently charging fresh or regenerated catalyst in a continuous or intermittent mode of operation to the moving-bed reactor. In addition, spent catalyst recovery facilities will be added for collecting the spent catalyst, storing it temporarily, and transferring it to a catalyst regeneration facility. The moving-bed reactors, the catalyst feeding facilities and the catalyst recovery facilities are operatively connected between themselves and to the existing facilities (piping, ancillary equipment) of the fixed-bed unit that will not require replacement. In addition, the recycle gas circuit will be modified to split the stream between the first reactor and at least one subsequent reactor, normally between the first reactor and the second reactor, as described above.

The moving-bed reactors are operated at an effective pressure to improve reformate quality and yield compared to the quality and yield from the fixed-bed unit before the conversion. The moving-bed reformer reactors of the converted unit may be operated at an effective pressure that is sufficiently low to improve substantially the reformate quality and yield as compared to the reformate quality and yield obtained from the fixed-bed unit before conversion. The pressure is, however, maintained during normal operation at a value which is sufficiently high to allow the use of the existing equipment of the fixed-bed catalytic reformer unit including the recycle compressor, heat exchangers and furnaces. The use of a higher pressure than typical for a fully integrated continuous reactor-regenerator is desirable in that it enables the rate of catalyst flow for regeneration to be reduced (relative to that of an integrated unit) and so relieves the burden of catalyst handling while operation with the split recycle permits the use of the Pt/Re based catalysts preferred in the higher pressure operation at pressures above about 11 barg and usually above 12 barg. As noted above, pressures in the range 15 to 30 barg, e.g. 24-27 barg may be expected with these converted units.

The catalyst may be any reforming catalyst which may be found suitable for the operation of the unit. Invariably, these will be platinum based bimetallic or trimetallic catalysts with the platinum combined with a second metal, normally tin, rhenium or iridium. The Pt/Re metal systems which have conventionally been used in fixed bed units will normally be suitable at the pressures encountered in the converted units with the obvious proviso that the catalyst must be fabricated into a form suitable for moving bed operation, i.e. in bead form, typically with a bead size of 1 to 10, e.g. 1-3 mm, so as to minimize attrition. If desired and operating conditions permit, the Pt/Sn system may be used, as is typical of continuous catalytic reforming (CCR) units. The optimal choice of catalyst may be made empirically depending upon unit configuration and operating conditions, with a wide range of catalysts being commercially available. As noted above, however, the present invention is of particular utility with the Pt/Re catalysts which, although favored for fixed bed application, tend to exhibit excessive hydrogenolysis activity in moving bed operation. It is also applicable, however, to other catalyst metals and metal systems in which excessive hydrogenolysis is encountered when the catalyst is used in moving bed operation. This would include, for example, bimetallic Pl/Ir catalysts. Whichever metal system is used, however, third modifying metals may also be present, for example, iridium, rhodium or ruthenium, e.g. trimetallics such as Pt/Re/Ir. The amount of the platinum group metal will typically be from 0.01 to 5 wt. pct, more usually from 0.1 to 0.3 wt pct of the metal of which most will be platinum. The support material will conventionally be alumina. The catalyst preferably has a high surface area, for example, from 100 to 200 $m^2g^{-1}$. As is conventional, halogenation treatment will be applied in order to maintain the acid function of the catalysts and conventional materials and techniques will be directly applicable. Descriptions of typical reforming catalysts and halogenation treatments are to be widely found in the technical and patent literature.

Regeneration of the catalyst may take place as described in application Ser. No. 10/609,801, that is, using an offsite catalyst regeneration facility or, alternatively, a community onsite continuous catalyst regeneration facility, i.e., a continuous catalyst regenerator that is shared between more than one reactors or a non-continuous onsite regeneration facility for one or more catalytic reformer units.

The composition of hydrocarbon feeds and products will be dictated by refinery equipment and conditions and product needs. In brief, the feed will typically be a petroleum naphtha with a boiling range of 20°-250° C. (about 70°-480°F.), more usually 60°-200° C.(about 140°-390° F.) although higher end points are frequently encountered. Typical feeds include straight run naphthas, cracked naphthas, synthetic naphthas such as shale oil naphtha, hydrocracked naphthas and blends of the above. Feed pretreatment to reduce contaminants especially sulfur and nitrogen to very low levels typical of reforming is required in the conventional manner. Conditions for the moving bed reactors will typically include temperatures form 425°-650° C. (about 800° to 1200° F.) usually 425°-550° C. (about 800°-1000° F.) at the pressures described above, with other parameters such a space velocity and overall hydrogen/hydrocarbon ratio conventional for moving bed operation. Descriptions of typical reforming processes are to be widely found in the technical and patent literature.

The invention claimed is:

1. A reforming process in which a hydrocarbon naphtha feed containing aliphatic hydrocarbons is converted to a hydrocarbon product comprising an increased proportion of aromatics by passage over a reforming catalyst in a sequence of moving bed reactors operating under reforming conditions including a hydrogen partial pressure of at least 11 barg in which hydrogen is fed to at least one reactor subsequent to the first reactor in addition to the first reactor of the sequence.

2. A process according to Claim 1 in which the hydrogen fed to the reactors is recycle hydrogen separated from the reforming products.

3. A process according to Claim 2 in which the sequence of moving bed reactors includes three reactors and the hydrogen is fed to the first reactor and the second reactor of the three-reactor sequence.

4. A process according to Claim 2 in which the hydrogen separated from the reforming products is heated by heat exchange with the reforming products prior to entering the first reactor.

5. A process according to Claim 3 in which the hydrogen separated from the reforming products is heated by heat exchange with the reforming products prior to entering the first and the second reactor of the sequence.

6. A process according to Claim 5 in which the hydrogen separated from the reforming products is split into two streams which are heated separately by heat exchange with the reforming products.

7. A process according to Claim 1 in which the reforming catalyst is a Pt/Re catalyst.

8. A process according to Claim 1 which is operated at a pressure of 12 to 30 barg measured at the inlet of the first reactor.

9. A process according to Claim 8 which is operated at a pressure of 12 to 27 barg measured at the inlet of the first reactor.

10. A process according to Claim 9 in which the reforming catalyst is a Pt/Re catalyst.

11. A reforming process in which a hydrocarbon naphtha feed in the boiling range of 60° to 200° C. which contains aliphatic hydrocarbons is converted to hydrogen and a hydrocarbon product comprising an increased proportion of aromatics relative to the naphtha feed by passage over a reforming catalyst under reforming conditions including a temperature in the range of 425°-650° C. and a hydrogen partial pressure of at least 11 barg in a sequence of moving bed reforming reactors following which hydrogen is separated from the hydrocarbon reforming product and recycled to the first reactor of the sequence and to at least one reactor in the sequence subsequent to the first reactor.

12. A process according to Claim 11 in which the sequence of moving bed reactors includes three reactors and the hydrogen is fed only to the first reactor and the second reactor of the three-reactor sequence.

13. A process according to Claim 12 in which the hydrogen separated from the reforming products is heated by heat exchange with the reforming products prior to entering the first reactor.

14. A process according to Claim 13 in which the hydrogen separated from the reforming products is heated by heat exchange with the reforming products prior to entering the first and the second reactor of the sequence.

15. A process according to Claim 14 in which the hydrogen separated from the reforming products is split into two streams which are heated separately by heat exchange with the reforming products.

16. A process according to Claim 11 in which the reforming catalyst is a Pt/Re catalyst.

17. A process according to Claim 11 which is operated at a pressure of 12to 30 barg measured at the inlet of the first reactor.

18. A process according to Claim 17 which is operated at a pressure of 12to 27 barg measured at the inlet of the first reactor.

19. A process according to Claim 18 in which the reforming catalyst is a Pt/Re catalyst.

20. A reforming process in which a hydrocarbon naphtha feed in the boiling range of 60° to 200° C. which contains aliphatic hydrocarbons is converted to hydrogen and a hydrocarbon product comprising an increased proportion of aromatics relative to the naphtha feed by passage over a reforming catalyst comprising platinum and rhenium on an alumina support under reforming conditions including a temperature in the range of 425°-550° C. and a hydrogen partial pressure of at least 12 barg in a sequence of three moving bed reforming reactors following which hydrogen is separated from the hydrocarbon reforming product and split into two streams, one of which is heated by heat exchange with reforming product effluent from the third reactor of the sequence before being recycled to the first reactor of the sequence with the other stream being separately heated by heat exchange with reforming product effluent from the third reactor of the sequence before being recycled to the second reactor of the sequence.

* * * * *